United States Patent
Schmid-Koemmerling

(10) Patent No.: US 11,746,806 B2
(45) Date of Patent: Sep. 5, 2023

(54) DEVICE FOR FASTENING A PREFERABLY PLANAR OBJECT TO A CONSTRUCTION

(71) Applicants: Peter Schmid-Koemmerling, West Vancouver (CA); Christopher Georg Schmid-Kömmerling, West Vancouver (CA); Alexander Otto Schmid-Kömmerling, West Vancouver (CA)

(72) Inventor: Peter Schmid-Koemmerling, West Vancouver (CA)

(73) Assignee: HOVR PATENTS INC., Abbotsford (CA)

(*) Notice: Subject to any disclaimer, the term of this patent is extended or adjusted under 35 U.S.C. 154(b) by 1243 days.

(21) Appl. No.: 16/323,834

(22) PCT Filed: Feb. 15, 2017

(86) PCT No.: PCT/EP2017/053401
§ 371 (c)(1),
(2) Date: Mar. 19, 2019

(87) PCT Pub. No.: WO2018/028842
PCT Pub. Date: Feb. 15, 2018

(65) Prior Publication Data
US 2019/0219080 A1    Jul. 18, 2019

(51) Int. Cl.
*F16B 2/14* (2006.01)
*A47B 96/06* (2006.01)
(Continued)

(52) U.S. Cl.
CPC ............... *F16B 2/14* (2013.01); *A47B 91/08* (2013.01); *A47B 96/066* (2013.01); *A47C 15/00* (2013.01);
(Continued)

(58) Field of Classification Search
CPC ..... A47B 96/066; A47B 91/08; A47B 96/063; A47B 96/067; A47B 96/028;
(Continued)

(56) References Cited

U.S. PATENT DOCUMENTS 1,891,048 A * 12/1932 Keefe ............... F16B 21/10
D6/550
1,915,479 A * 6/1933 Smith ............... A47K 10/10
248/222.14

(Continued)

FOREIGN PATENT DOCUMENTS

CN    202545451 U    11/2012
DE    196 18 515 A1   11/1997
(Continued)

OTHER PUBLICATIONS

International Search Report, dated Jun. 19, 2017, corresponding to International Application No. PCT/EP2017/053401.
(Continued)

*Primary Examiner* — Christopher Garft
*Assistant Examiner* — Michael McDuffie
(74) *Attorney, Agent, or Firm* — LADAS & PARRY LLP; Malcolm J. MacDonald

(57) ABSTRACT

A device for fastening a planar object to a construction, including a first holding element and a second holding element which can be interlockingly connected to the first holding element. The first holding element, which can be connected to the construction or to the object or is an integral part of the construction or of the object, has a C- or U-shaped inner profile, in that the second holding element, which can be connected to the object or the construction or is an integral part of the object or the construction, has a C- or U-shaped outer profile, and in that the C- or U-shaped outer profile can be interlockingly accommodated in the inner (Continued)

Figure 1:
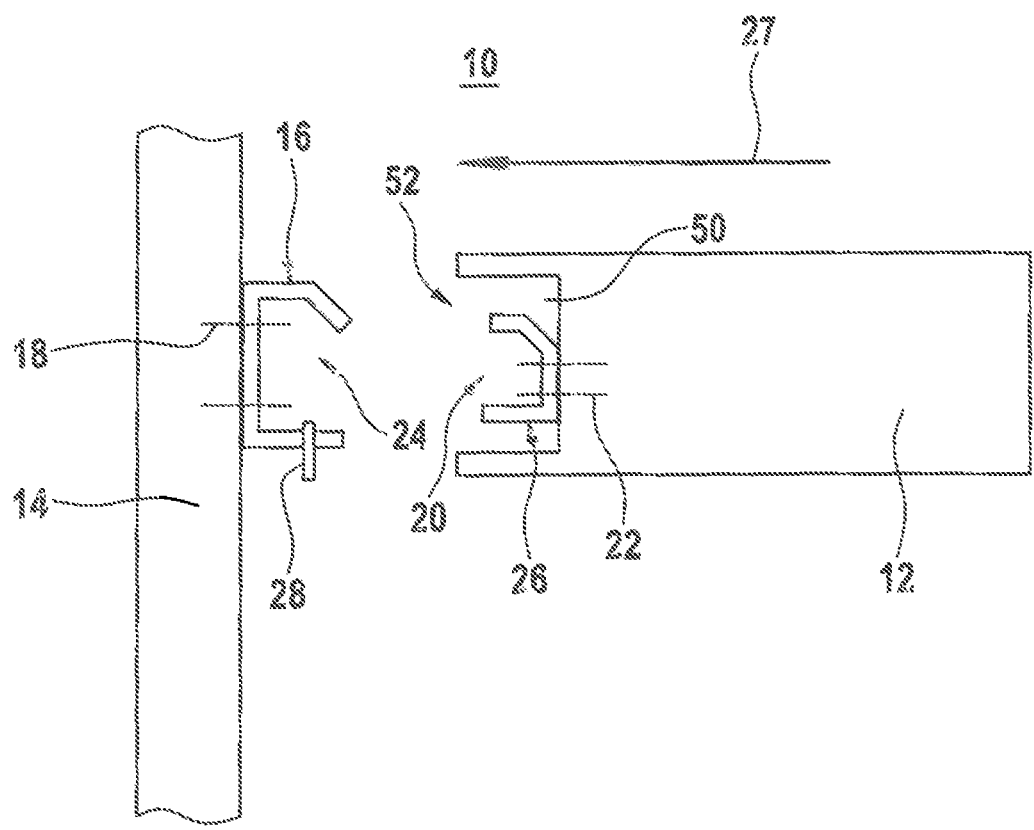

profile and can be clamped against the inner profile by means of a clamping element.

15 Claims, 17 Drawing Sheets

(51) Int. Cl.
*A47B 91/08* (2006.01)
*A47C 15/00* (2006.01)
*F16B 12/26* (2006.01)
*A47K 10/10* (2006.01)
*E06B 1/70* (2006.01)

(52) U.S. Cl.
CPC .......... *A47B 96/063* (2013.01); *A47B 96/067* (2013.01); *A47K 10/10* (2013.01); *E06B 1/702* (2013.01); *F16B 12/26* (2013.01)

(58) Field of Classification Search
CPC .......... A47B 96/061; F16B 2/14; F16B 12/26; A47C 15/00; A47K 10/10; E06B 1/702
USPC ............ 248/220.21, 220.22, 222.13, 222.14, 248/223.31, 223.41, 224.51, 224.61, 235, 248/239, 241, 247, 250, 224.7; 108/152, 108/37, 38, 57.17, 57.22, 57.31; 312/351; 211/187
See application file for complete search history.

(56) References Cited

U.S. PATENT DOCUMENTS

| | | | | |
|---|---|---|---|---|
| 3,333,555 A * | 8/1967 | Kapnek | ................ | A47B 96/066 248/217.4 |
| 3,437,214 A * | 4/1969 | John | .................... | A47B 96/067 211/90.04 |
| 3,596,861 A * | 8/1971 | Baldini | .................... | A47K 5/02 248/223.41 |
| 3,977,048 A | 8/1976 | Benedetti | | |
| 4,662,593 A * | 5/1987 | Shames | ................. | F16M 13/02 248/251 |
| 5,058,851 A * | 10/1991 | Lawlor | ..................... | B60R 1/04 248/223.41 |
| 5,197,703 A * | 3/1993 | Pratolongo | ............ | A47B 96/07 248/225.11 |
| 5,603,475 A * | 2/1997 | Lim | ........................ | A47K 10/04 411/82 |
| 6,050,426 A * | 4/2000 | Leurdijk | ............... | A47B 96/067 248/222.51 |
| 6,698,603 B2 * | 3/2004 | Lawson | ................ | A47F 5/0846 211/94.01 |
| 7,661,640 B2 * | 2/2010 | Persson | .................. | F16M 13/02 248/225.11 |
| 8,082,859 B2 * | 12/2011 | Sevack | ................ | A47B 96/066 248/250 |
| 8,882,065 B2 * | 11/2014 | Henriott | ............... | A47B 96/067 248/220.21 |
| 8,973,878 B2 * | 3/2015 | Thompson | ............. | A47G 1/175 403/348 |
| 9,185,979 B1 | 11/2015 | Jenks et al. | | |
| 10,258,145 B2 * | 4/2019 | Witzel | ................. | A47B 96/028 |
| 10,588,412 B2 * | 3/2020 | Graber | ................ | A47B 96/028 |
| 10,743,437 B2 * | 8/2020 | Ankarbjörk | ............ | F16M 13/02 |
| 11,116,317 B2 * | 9/2021 | LeBlanc | ................ | A47B 96/027 |
| 2008/0105637 A1 * | 5/2008 | Lawson | ................ | A47F 5/0853 211/94.01 |
| 2009/0224119 A1 * | 9/2009 | Heffernan | ............ | A47B 96/066 248/220.21 |
| 2018/0168410 A1 * | 6/2018 | Rutgers | .................. | A47K 10/10 |

FOREIGN PATENT DOCUMENTS

| | | |
|---|---|---|
| DE | 20 2006 005260 U1 | 8/2007 |
| DE | 20 2012 102484 U1 | 10/2013 |
| FR | 2575243 A1 | 6/1986 |
| RU | 2576584 C1 | 3/2016 |

OTHER PUBLICATIONS

Russian Search Report, dated Oct. 18, 2019, for Russian Application No. 2019105293, and an English Translation thereof.

* cited by examiner

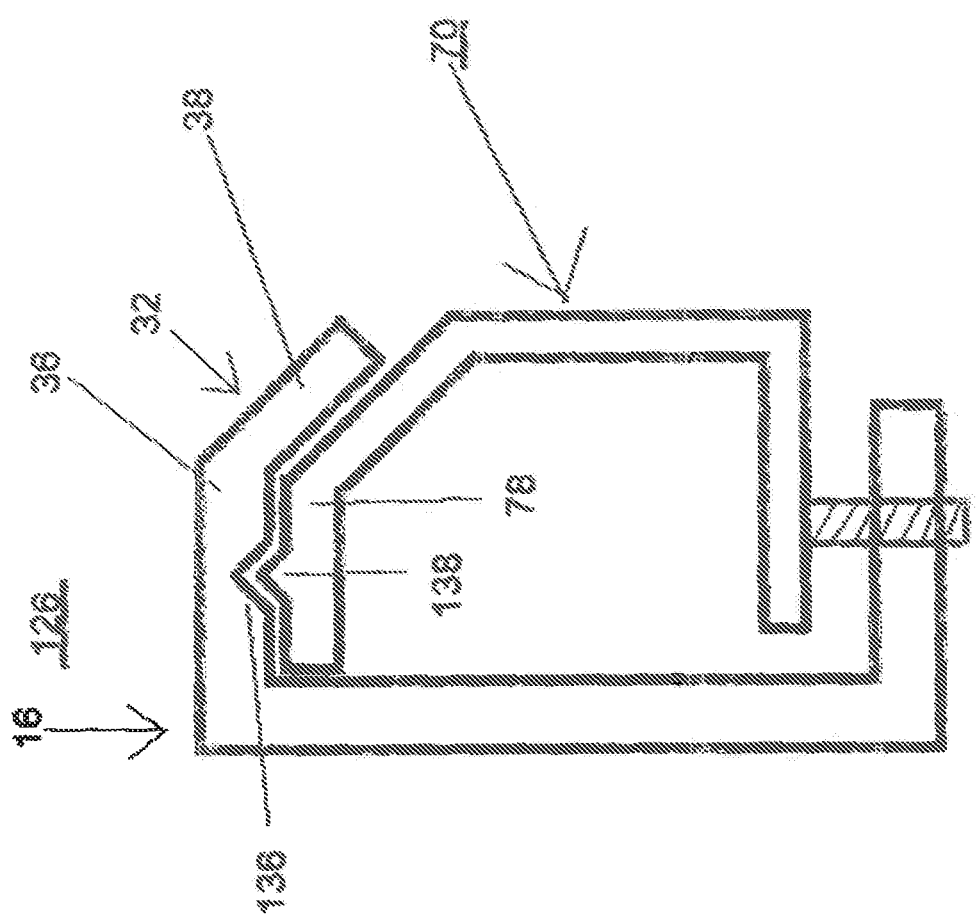

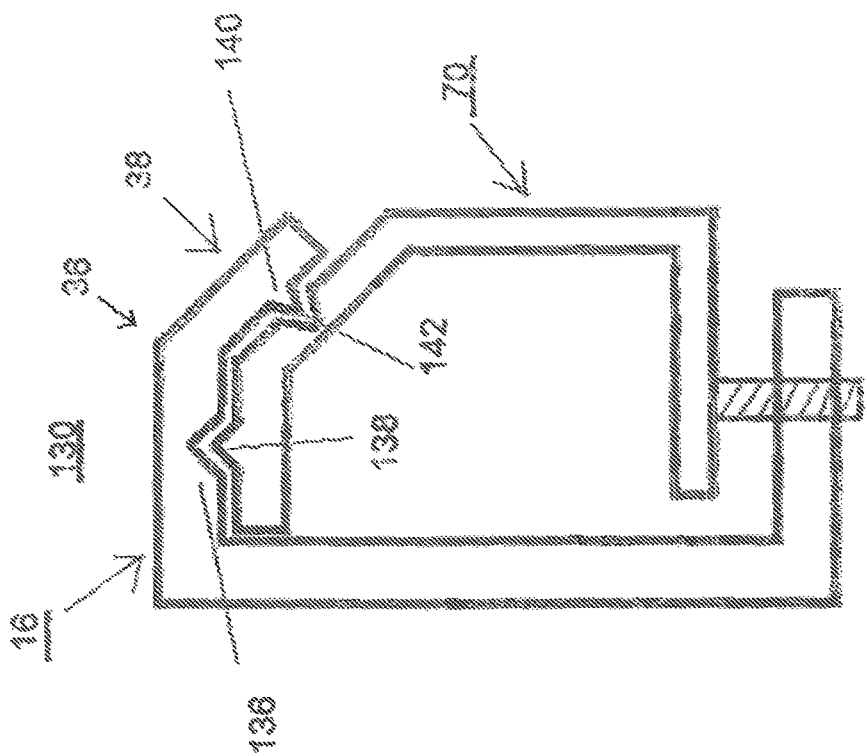
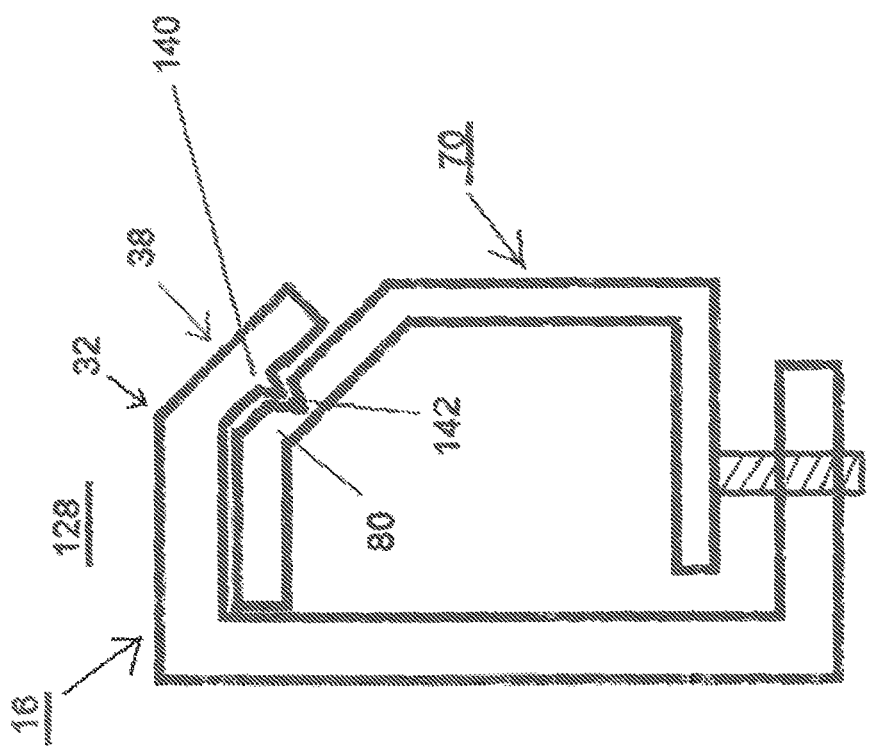

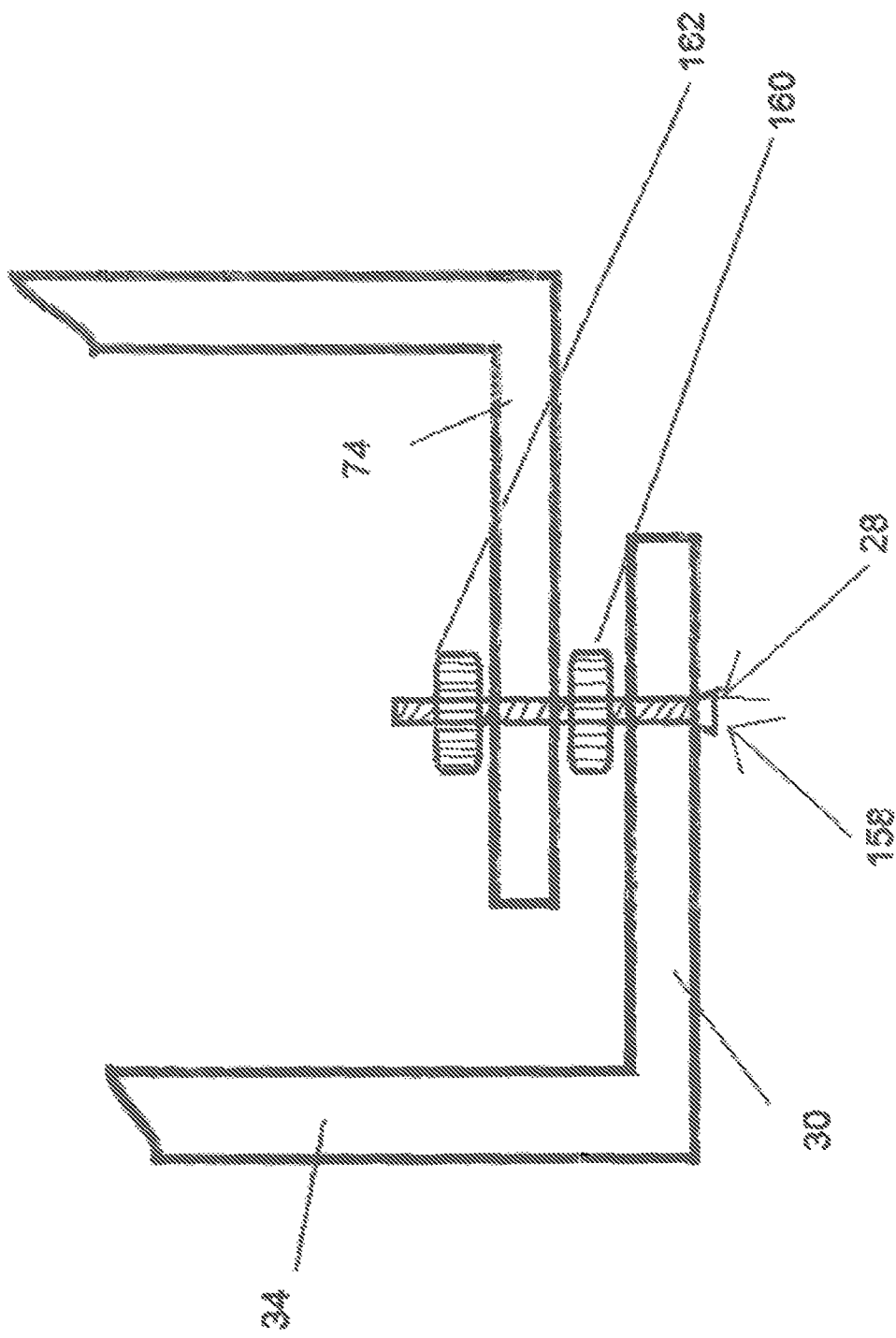

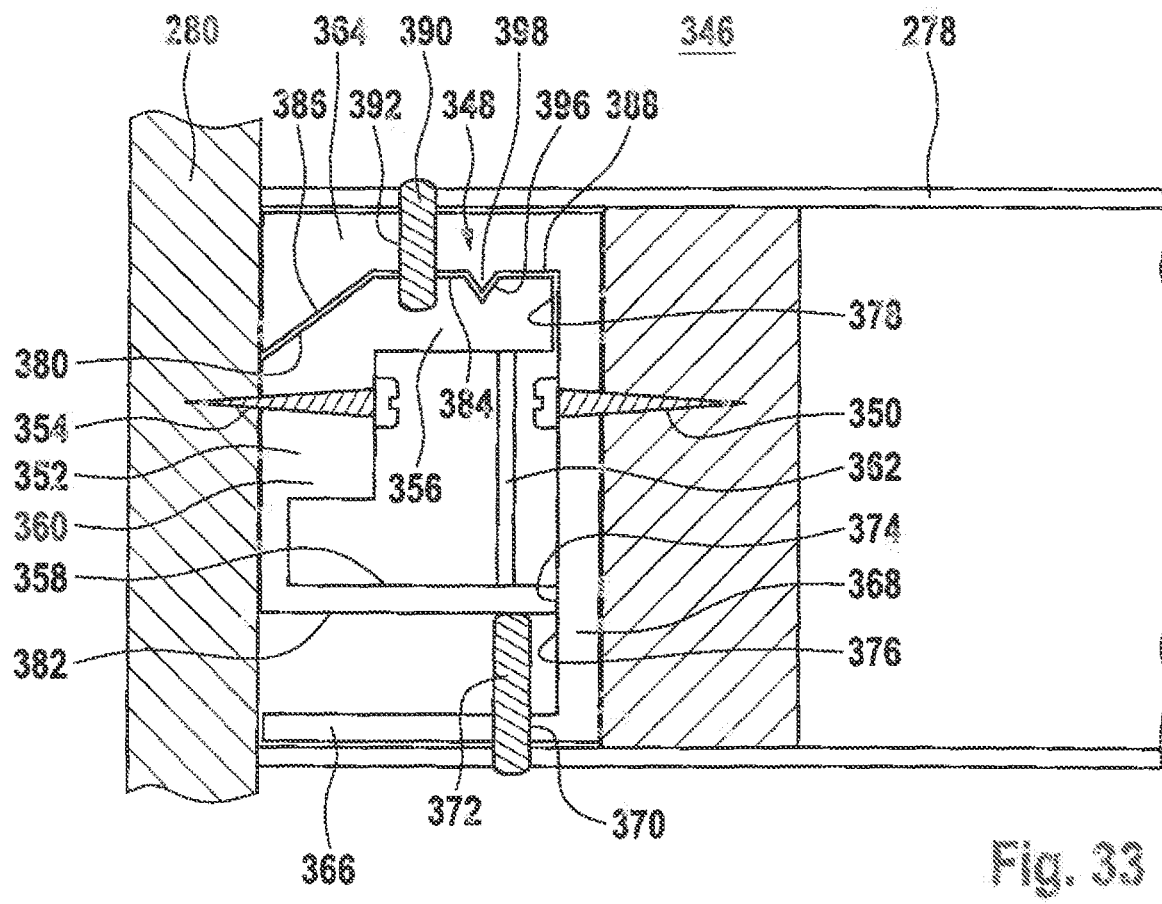
Fig. 33
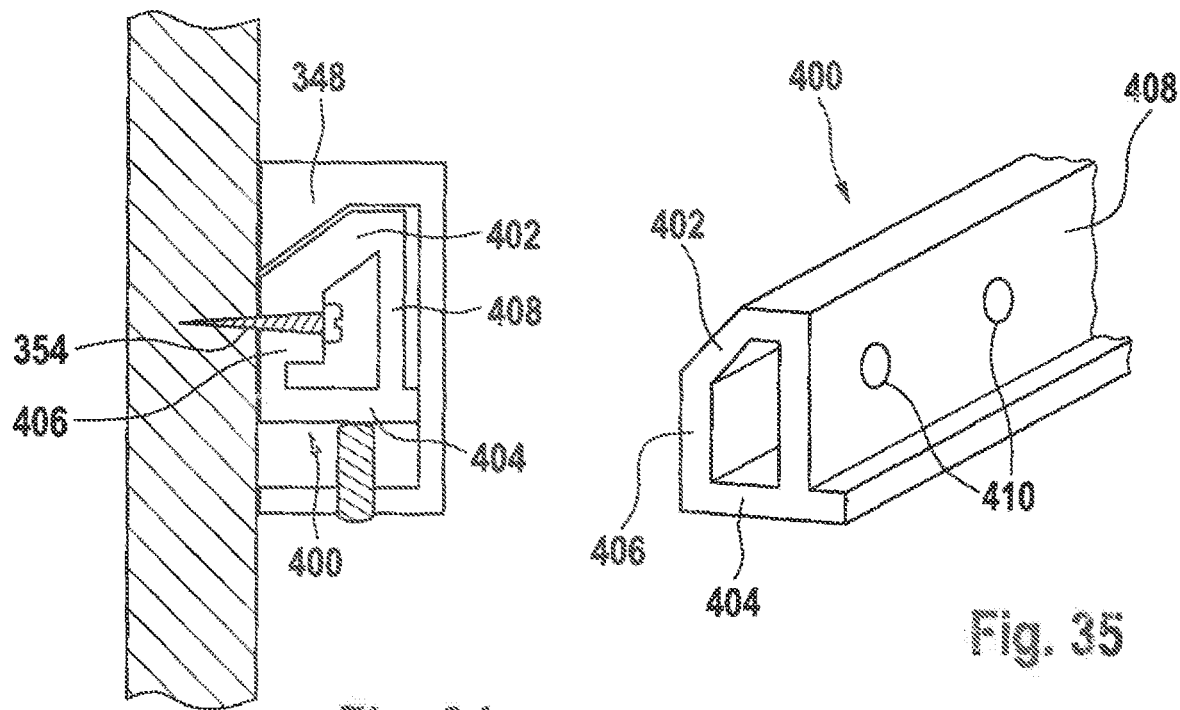
Fig. 34
Fig. 35

DEVICE FOR FASTENING A PREFERABLY PLANAR OBJECT TO A CONSTRUCTION

The invention relates to a device for mounting a preferably planar object, such as a shelf or seat, to a building structure, such as a wall or floor, comprising a first holding element as well as a second holding element, whereby the second holding element can be connected in a form-locking manner with the first holding element.

A corresponding device is known from U.S. Pat. No. 9,185,979 B1. The device comprises a "floating" metal shelf and a mounting rail for mounting the shelf to a wall.

The metal shelf is embodied rectangularly and comprises five enclosed sides, in particular enclosed top and bottom sides, enclosed lateral sides, as well as an enclosed front side. The metal shelf comprises a back, which is partially enclosed.

Based on this prior art, the objective of the present invention is to further develop a mounting device of the above-mentioned type in such a way that it possesses a simple design and provides ample versatility. In particular, it should provide for the option to offset the object along the horizontal direction when it is being secured in place.

This objective is met by the invention with a first holding element that can be connected to the building structure or to the object, or is an integral part of the building structure or of the object, and possesses a C- or U-shaped inner profile, further a second holding element that can be connected to the object or the building structure, or is an integral part of the object or of the building structure, and possesses a C- or U-shaped outer profile, and that the C- or U-shaped outer profile can be accepted in a form-locking manner in the inner profile and can be tensioned against the inner profile by means of at least one clamping element.

The first holding element possesses a C- or U-shaped interior profile, in which the C- or U-shaped outer profile of the second holding element can be accepted in a form-locking manner and can be tensioned against the first holding element by means of at least one clamping element.

Both the C- or U-shaped outer profile and the C- or U-shaped inner profile comprise corresponding oblique legs or sections, which in the assembled state adjoin each other. In parallel to the oblique legs or sections, both the first and the second holding element possess straight legs or sections, whereby in the straight leg or section of the first holding element the clamping element is accommodated in the form of a screw, which can be tensioned against the straight leg or section of the second holding element, which results in the first holding element and the second element being clamped in a wedge-like manner.

In a preferred embodiment it is intended that the C- or U-shaped inner profile of the first holding element is the inner profile of a C- or U-shaped track or the inner profile of an extruded profile, such as an extruded A1 profile.

A preferred embodiment is characterized in that the C- or U-track comprises a first and a second leg as well as a web connecting the legs, whereby the first leg extends perpendicular relative to the web and whereby the second leg comprises a first leg section or surface section, which extends straight and perpendicular relative to the web, and, as a continuation of the first leg section or surface section, a second leg section or surface section that is curved or inclined in the direction to the first leg and extends obliquely relative to the straight leg section or the surface section.

It is further intended that the C- or U-shaped outer profile of the second holding element is embodied as an outer profile of a C- or U-shaped track or as an outer profile of an extruded profile, such as an extruded A1 profile. Preferably the C- or U-shaped track possesses a first and a second leg, as well as a web connecting the legs, whereby the first leg extends straight and perpendicular to the web and whereby the second leg comprises a first leg section that extends with an obtuse angle relative to the web, as well as a second leg section, which adjoins the first oblique leg section and extends in parallel to the first leg.

To improve the securing in place and to simplify the positional compensation along the horizontal and/or vertical direction it is intended that the first leg and/or the second leg of the first holding element each comprise an oblique leg section or oblique surface section and that the oblique leg section or surface section interacts with a corresponding oblique leg section or surface section of the second holding element.

It may also be intended that the at least one clamping element is arranged in the first leg and/or the second leg, the straight leg section and/or the oblique leg section.

To align the object in the form of a shelf or seat along the horizontal direction after fastening it in position, it is intended that the at least one clamping element is embodied as a screw, e.g. a stud screw, which is accommodated in a screw thread of the first or second leg of the first holding element, whereby a central axis of the clamping element extends parallel to the web.

For the purpose of facilitating a simple assembly it is intended that the first holding element possesses a front opening with a width (W) that is greater than a height (H) of the C- or U-shaped outer profile of the second holding element. In this embodiment, the second holding element with the attached object can be inserted into the first holding element at the front.

An alternative option is provided if the second holding element can be pushed into the first holding element from its end face along its longitudinal axis. In this embodiment, the first holding element has a frontal opening with a width (W), which is lesser an a height (H) of the C- or U-shaped outer profile of the second holding element.

A further preferred embodiment is characterized in that the second holding element is arranged in the first holding element in a manner where it can be latched by means of latching elements.

In this arrangement, the straight and/or oblique leg section or surface section of the second holding element comprises on its outside along the longitudinal direction a latching lug or slot, whereby an inner surface of the straight or oblique leg sections of the first holding element correspondingly comprises a slot to accept the latching lug or a latching lug to engage in the receptacle of the slot.

Preferably the first or second holding element with its web is arranged at a longitudinal edge of a planar object such as a shelf or is fastened to that edge. In a "floating" arrangement, the first or the second holding element is arranged hidden in a groove or in a cavity of a longitudinal edge of the planar object.

For the purpose of reinforcing the connection between the first or the second holding element and the planar object, it is intended that from the web of the first or the second holding elements extends a reinforcement tab as a connection to the planar object, whereby the reinforcement tab extends perpendicular to the web and together with the latter forms an L-shape or a T-shape.

Alternatively, two reinforcement tabs may originate from the web, which in this case will form—together with the web—a U-shape to accommodate the planar object.

In a preferred embodiment it is intended that the first or the second holding element with its web can be mounted at the wall surface or a floor surface and that the planar object is a shelf, a window sill, a seat, or a wall element.

Further details, advantages, and features of the invention are not only found in the claims, the characteristic features listed therein—individually and/or in combination—but also in the following description of preferred embodiment examples illustrated in the drawings.

Figure 2:
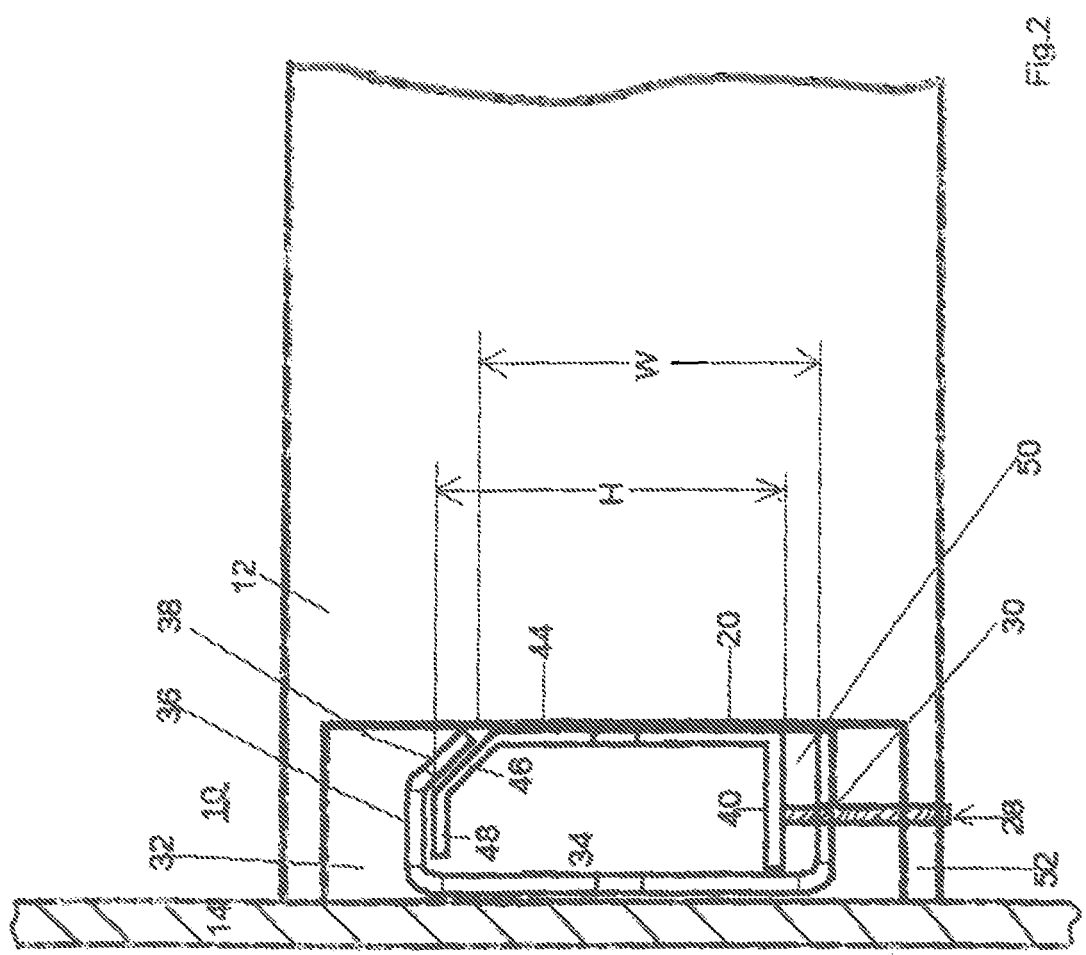
Figure 3:
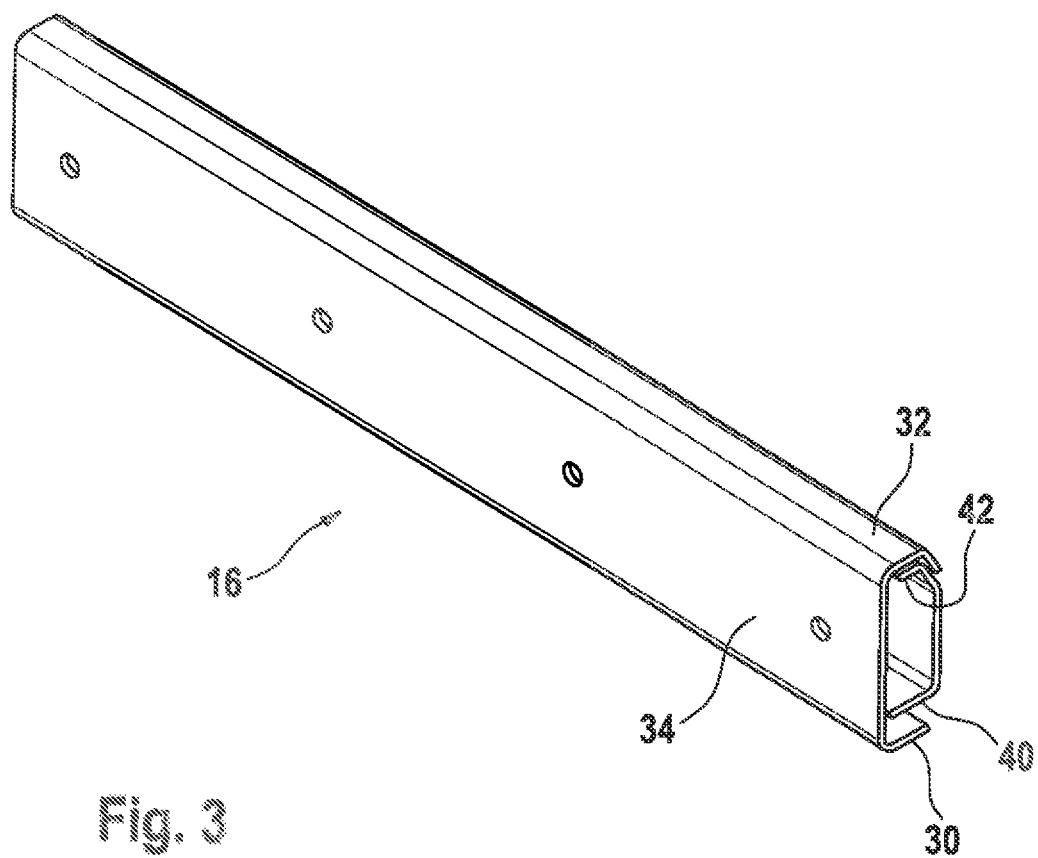
Figure 4:
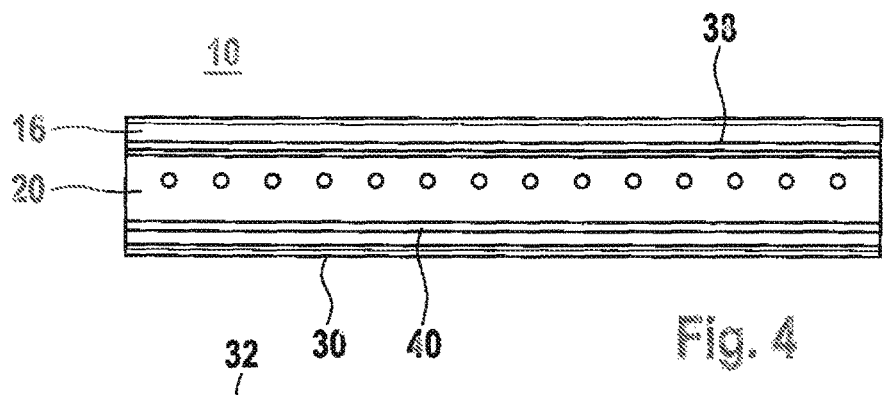
Figure 5:
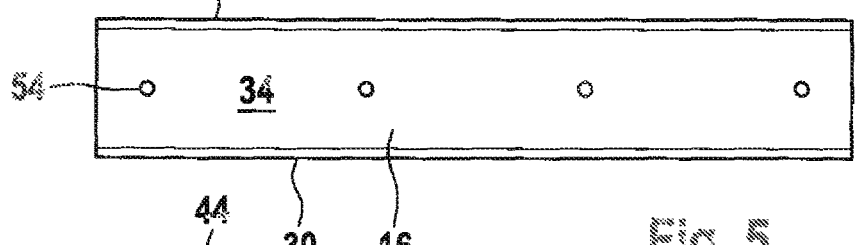
Figure 6:
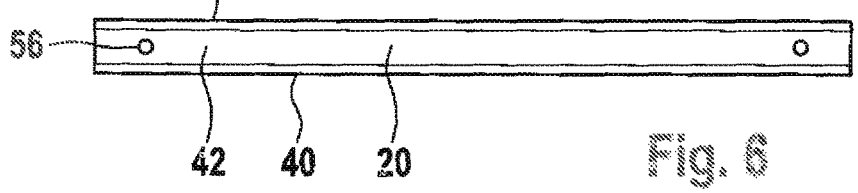
Figure 7:
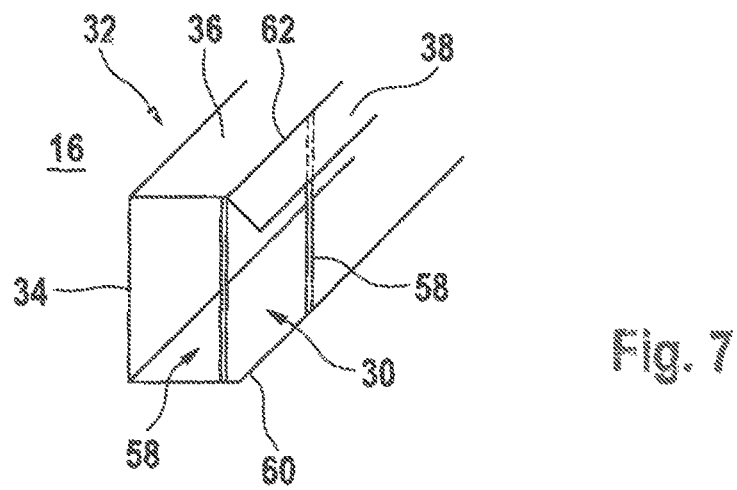
Figure 8:
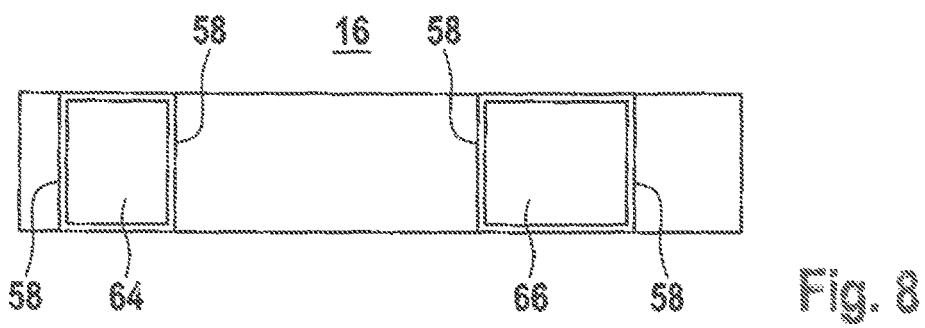
Figure 9:
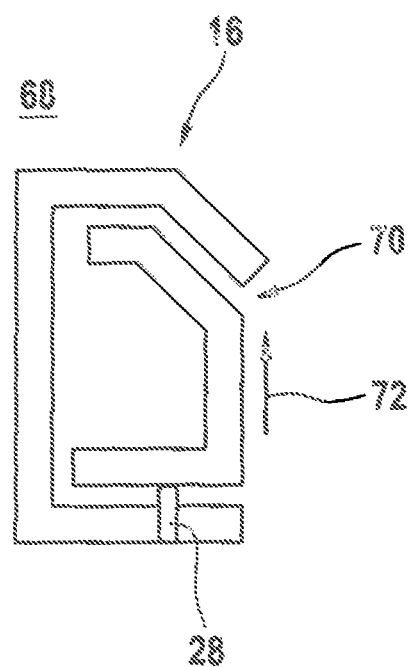
Figure 10:
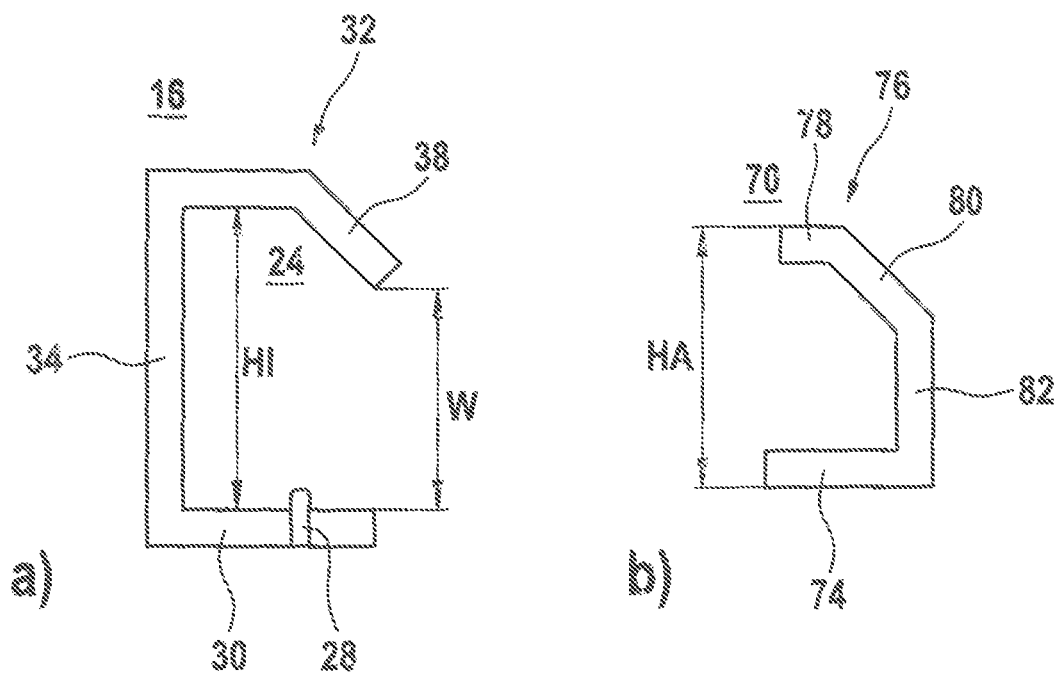
Figure 11:
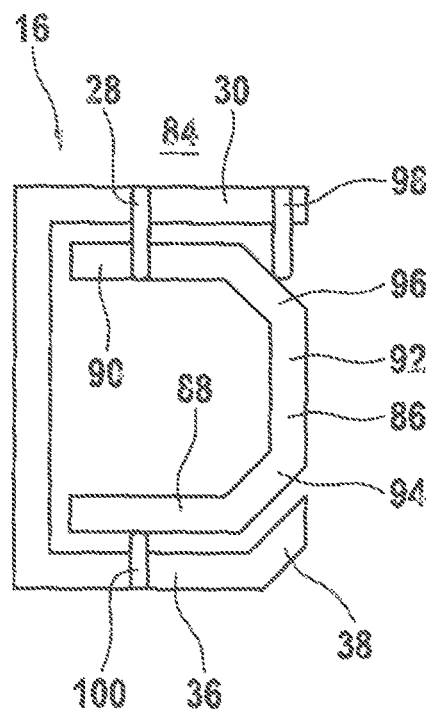
Figure 12:
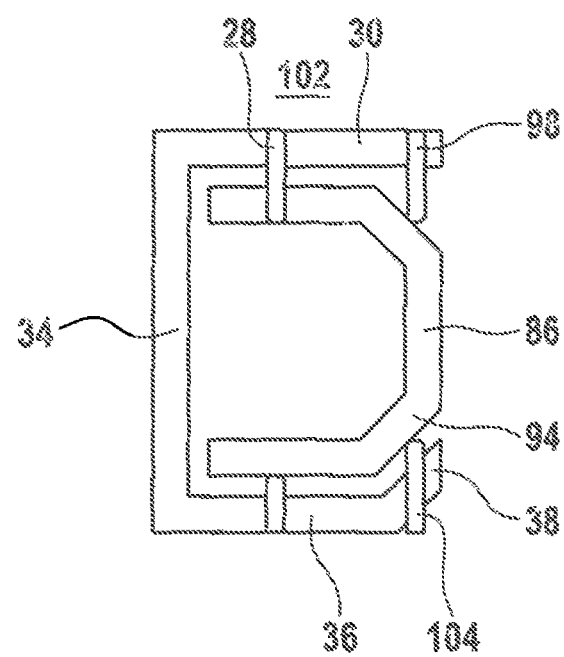
Figure 13:
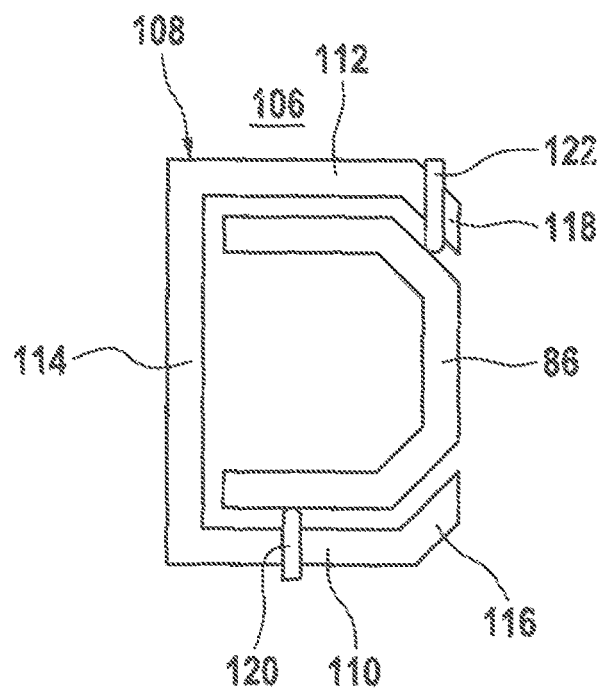
Figure 14:
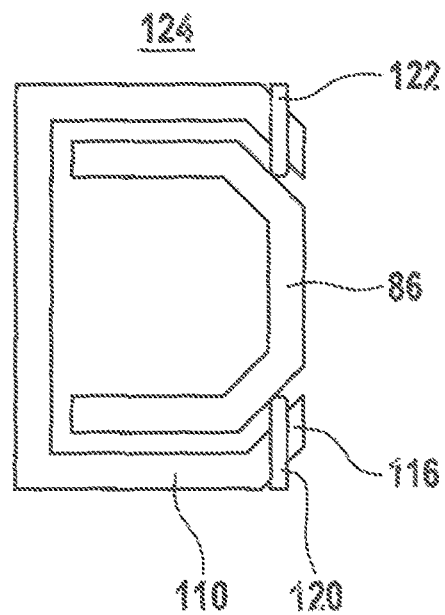
Figure 19:
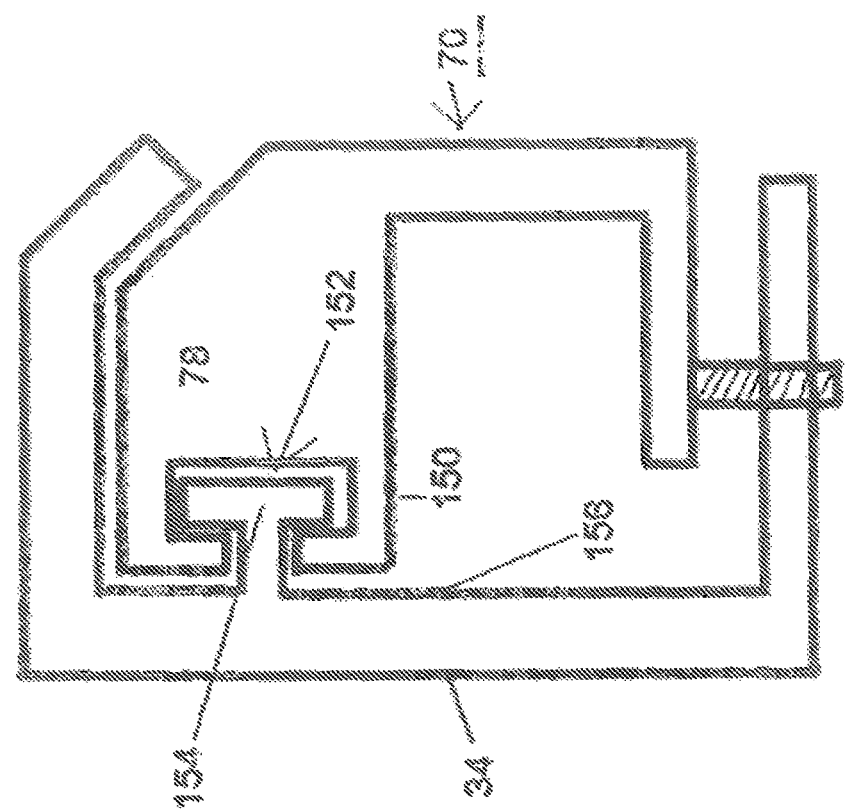
Figure 18:
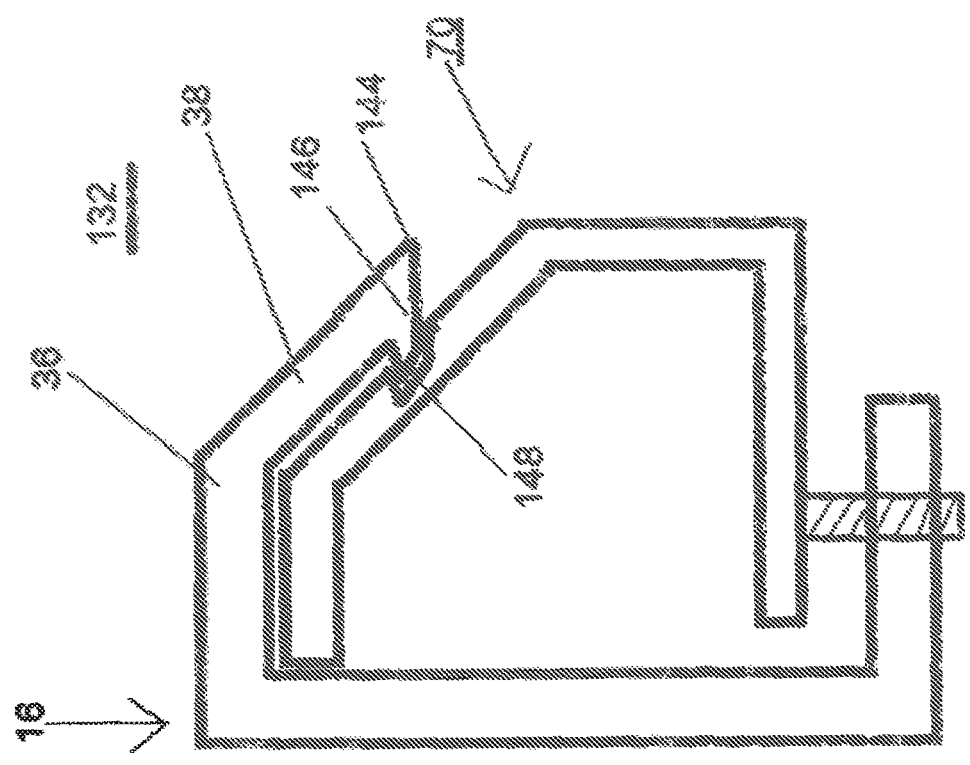
Figure 21:
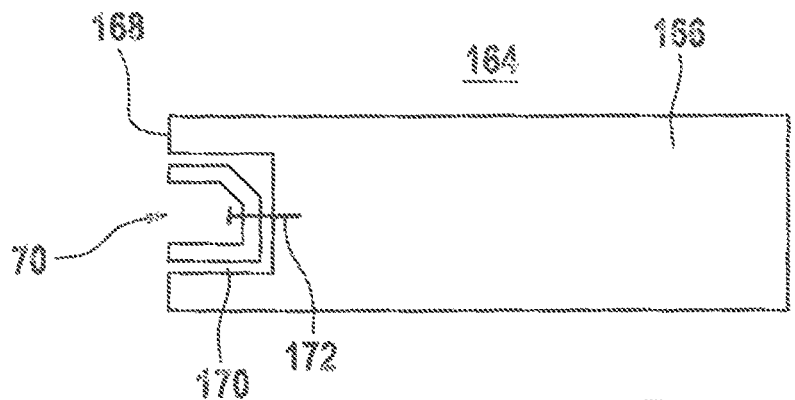
Figure 22:
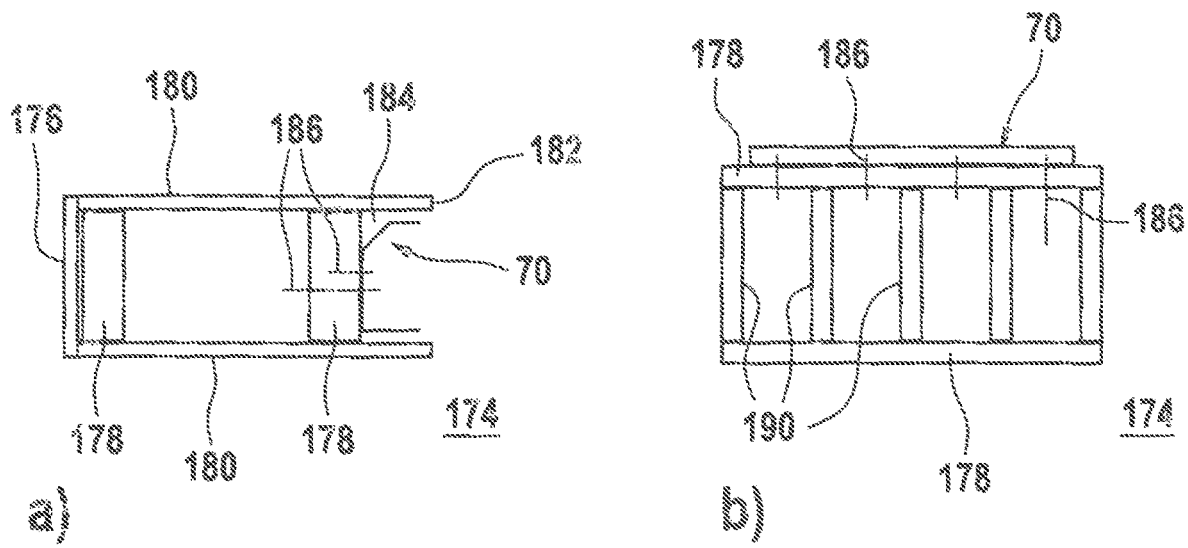
Figure 23:
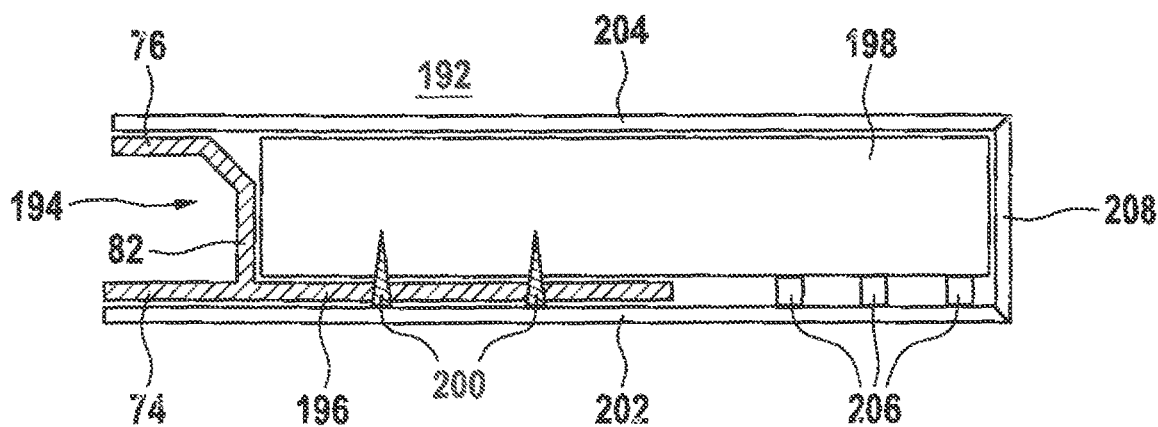
Figure 24:
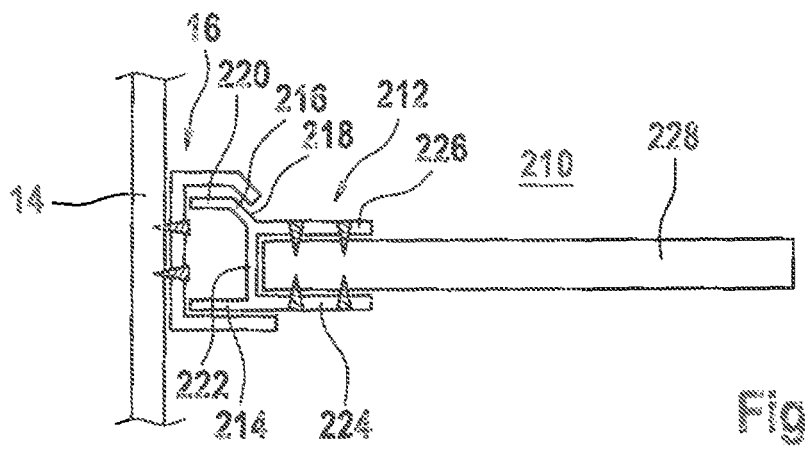
Figure 25:
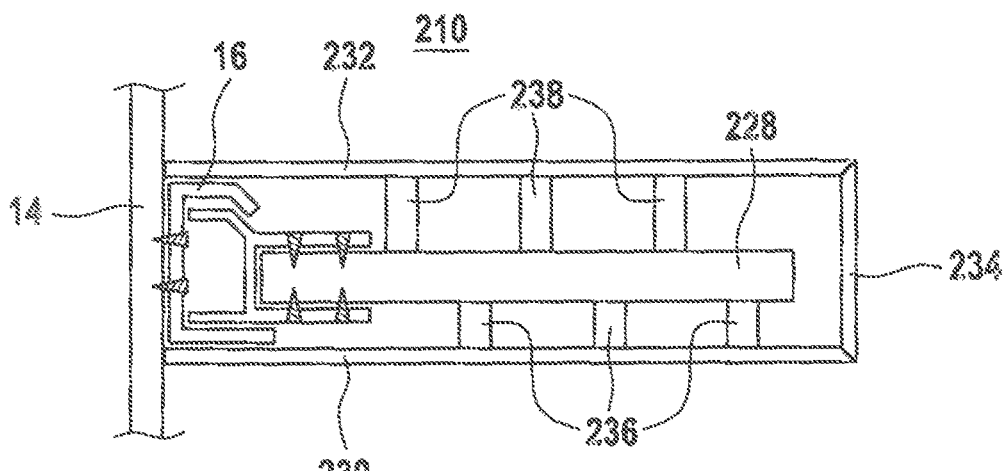
Figure 26:
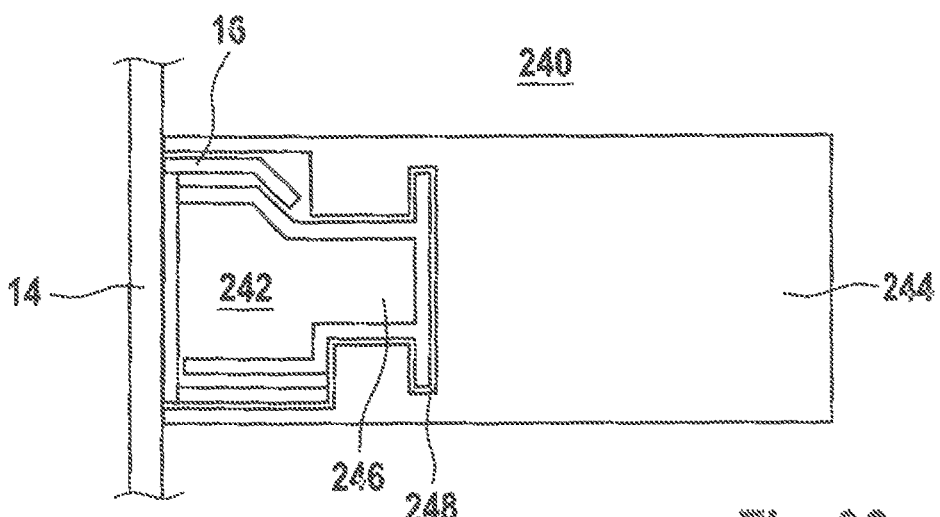
Figure 27:
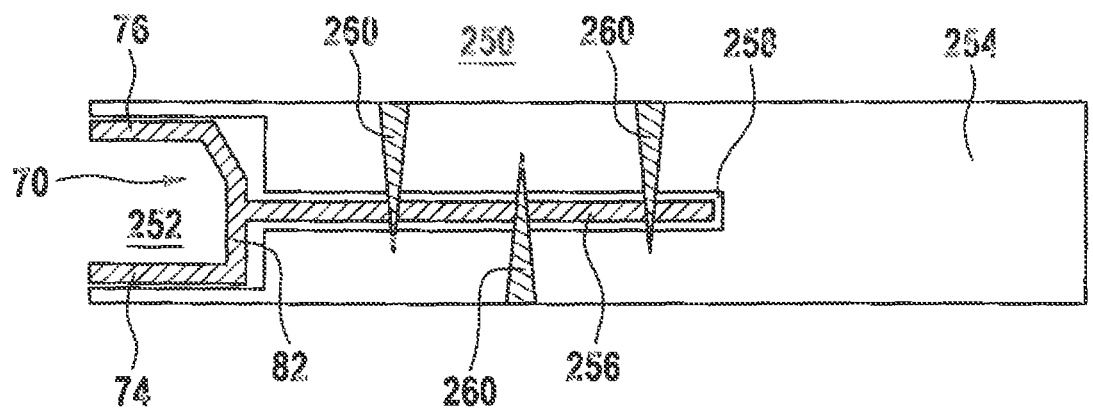
Figure 28:
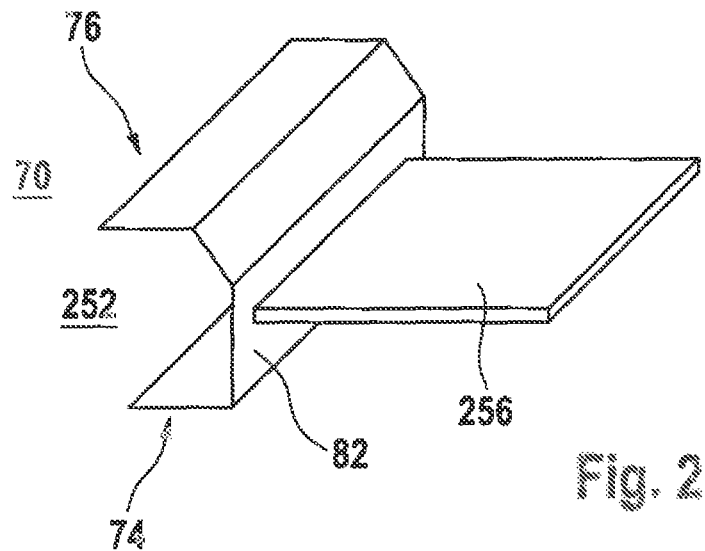
Figure 29:
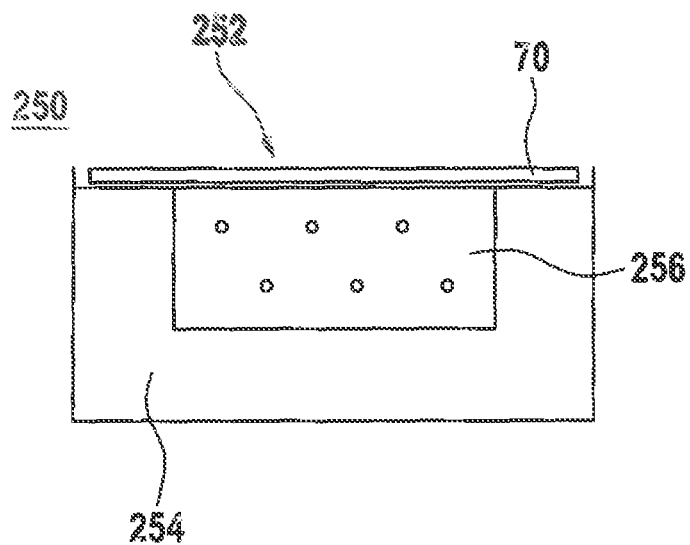
Figure 30:
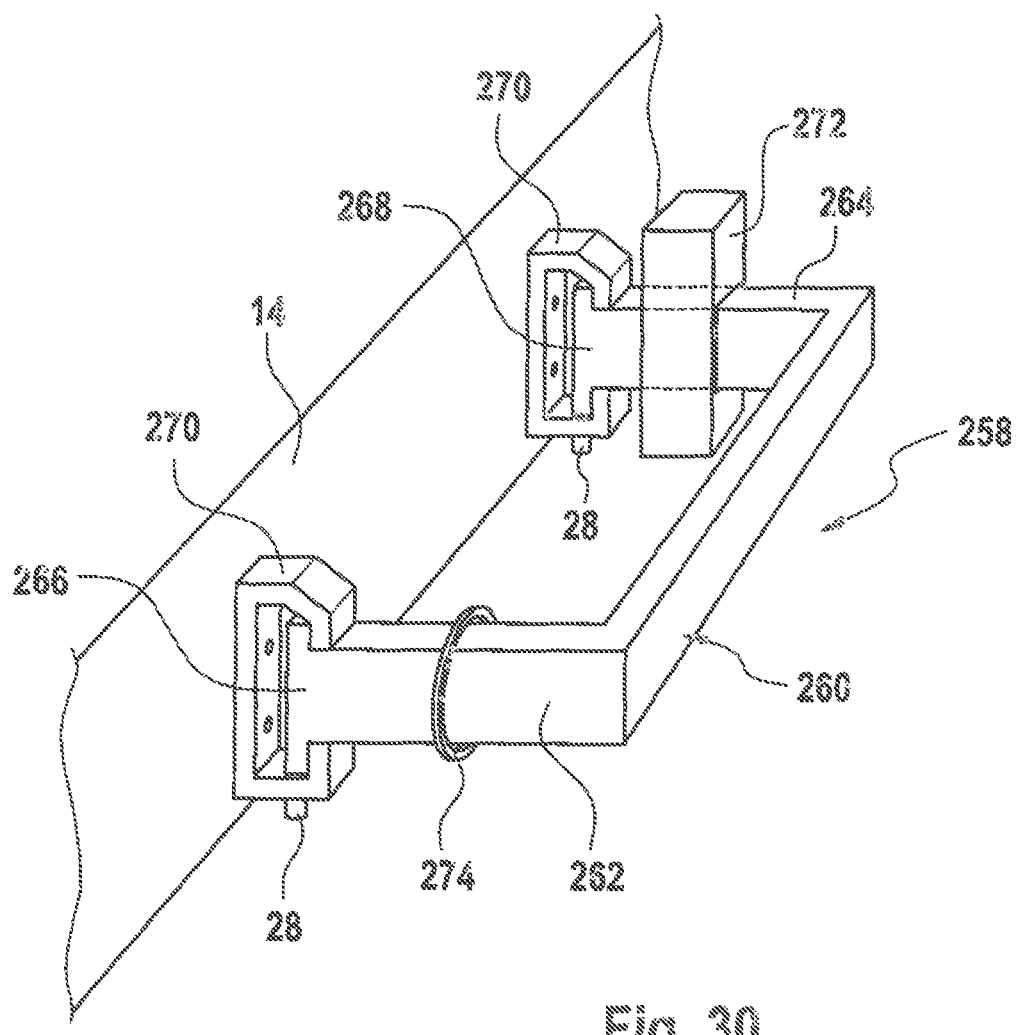
Figure 31:
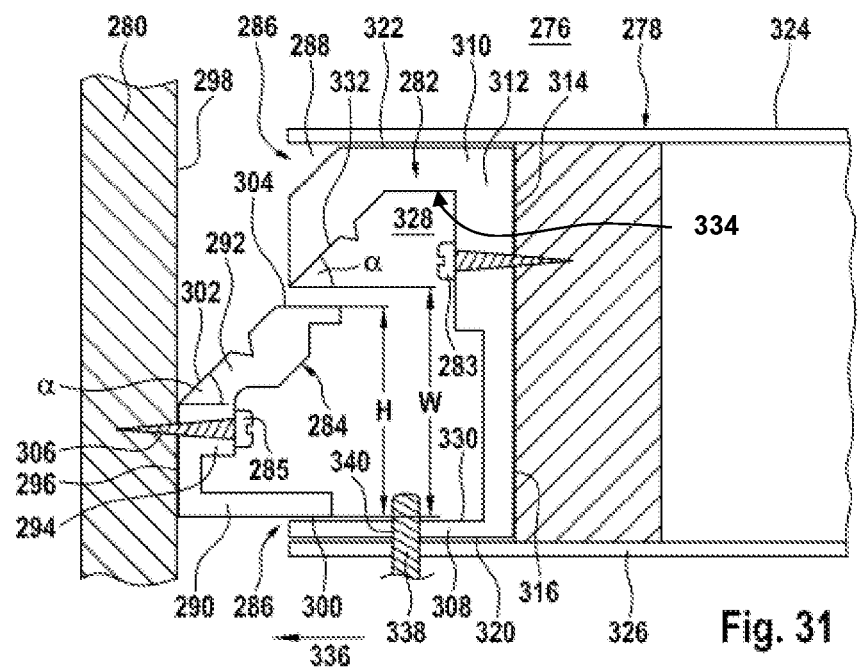
Figure 32:
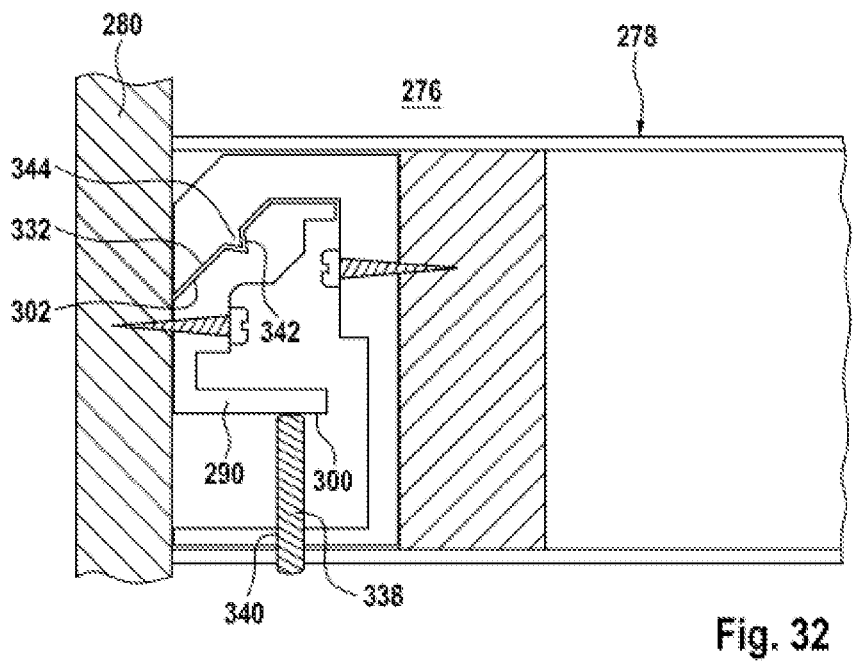

The figures show:

FIG. 1 shows a lateral view of a mounting device with a first embodiment of a first and a second holding element for mounting a shelf, FIG. 2 shows a lateral view of the mounting device in an assembled state, FIG. 3 shows a perspective representation of the first embodiment of the first and second holding element of FIG. 1, FIG. 4 shows a front view of the mounting device, FIG. 5 shows a rear view of the first holding element of the mounting device, FIG. 6 shows a rear view of the second holding element of the mounting device, FIG. 7 shows a perspective representation of a second embodiment of a first holding element with a connecting web, FIG. 8 shows a front view of a first holding element of FIG. 7 with a connecting web, FIG. 9 shows a lateral view of a mounting device with a second embodiment of the second holding element, FIG. 10a shows a lateral view of the first holding element of the mounting device of FIG. 9, FIG. 10b shows a lateral view of the second holding element of the mounting device of FIG. 9, FIG. 11 shows a lateral view of a mounting device with a third embodiment of the second holding element, FIG. 12 shows a lateral view of the mounting device of FIG. 11 with additional clamping elements, FIG. 13 shows a lateral view of a mounting device with a second embodiment of the first holding element, FIG. 14 shows a lateral view of the mounting device of FIG. 13 with a modified arrangement of the clamping elements, FIG. 15 shows a lateral view of the mounting device of FIG. 9 with a first embodiment of a latching mechanism, FIG. 16 shows a lateral view of a mounting device of FIG. 9 with a second embodiment of a latching mechanism, FIG. 17 shows a lateral view of a mounting device of FIG. 9 with a third embodiment of a latching mechanism, FIG. 18 shows a lateral view of a mounting device of FIG. 9 with a fourth embodiment of a latching mechanism, FIG. 19 shows a lateral view of a mounting device of FIG. 9 with a fifth embodiment of a latching mechanism, FIG. 20 shows a lateral view of a mounting device of FIG. 9 with a second embodiment of a clamping element, FIG. 21 shows a lateral view of a shelf with the second holding element accommodated in a longitudinal groove, FIG. 22a shows a sectional lateral view of a shelf with holding element, FIG. 22b shows a sectional top view onto a shelf with holding element, FIG. 23 shows a sectional lateral view of a shelf with a third embodiment of a second holding element, FIG. 24 shows a lateral sectional view of a shelf with a fourth embodiment of a second holding element, FIG. 25 shows a lateral view of the shelf of FIG. 24 with cover, FIG. 26 shows a lateral sectional view of a shelf with a fifth embodiment of a second holding element, FIG. 27 shows a lateral sectional view of a shelf with a sixth embodiment of a second holding element, FIG. 28 shows a perspective view of the sixth embodiment of the holding element of FIG. 27, FIG. 29 shows a top view of the shelf of FIG. 27, FIG. 30 shows a perspective view of a towel rack, FIG. 31 shows a lateral view of an alternative aspect of the mounting with a 7th embodiment of a first and second holding element in the disconnected state, FIG. 32 shows a lateral view of the mounting device of FIG. 31 in the assembled state, FIG. 33 shows a lateral view of the mounting device with an 8th embodiment of a first and second holding element, FIG. 34 shows a lateral view of the mounting device with a 9th embodiment of a first and second holding element, and FIG. 35 shows a perspective view of the ninth embodiment of the holding element of FIG. 34.

FIG. 1 shows in a lateral view a first embodiment of a mounting device 10 for mounting a planar object 12, such as a shelf, to a building structure 14, e.g. to a wall. The mounting device comprises a first holding element 16, which can be connected to the building structure 14 via fastening elements 18 such as screws. The mounting device further comprises a second holding element 20, which can be connected to the object 12 via fastening elements 22 such as screws.

According to the invention, the first holding element 16 is embodied clamp-shaped and possesses a C-shaped inner profile 24, into which the second holding element 20, which possesses a C-shaped outer profile 26, can be accepted in a form-locking fit. For this, the shelf 22 is directed into the first holding element 16 along the direction of the arrow 27 from the front, so that the second holding element 20 is accepted in the C-shaped inner profile 24 with a form-locking fit and can be tensioned by means of a clamping element 28, e.g. a stud screw, against the inner surface of the C-shaped inner profile 24.

FIG. 2 shows a lateral view of the mounting device 10 in the assembled state. The first holding element 16 possesses on its front an opening with a clear width W, which at least matches a height H of the C-shaped outer profile 26 of the second holding element 20, so that the second holding element 20 can be inserted on the front into the C-shaped inner profile 24 of the first holding element 16.

Both the first holding element 16 and the second holding element 20 are embodied as C-tracks, which is shown in the perspective representation of FIG. 3.

The first holding element 16 comprises a first leg 30, a second leg 32, as well as a web 34 connecting the legs 30, 32. The first leg 30 extends perpendicular to the web 34 and the second leg 30 comprises a first leg section 36, which extends perpendicular to the web 34 and in parallel to the first leg 30, as well as a second leg section 38, in extension of the first leg section 36, which is curved in the direction of the first leg 30, and extends obliquely relative to the straight leg section 36.

The second holding element 20 also is embodied as a C-track und comprises a first leg 40, a second leg 42, as well as a web 44 connecting the first leg 40 and the second leg 44. The first leg 40 extends substantially perpendicular to the web 44. The second leg 42 comprises a first leg section 46, which is curved in the direction of the first leg 40, and extends obliquely relative to the web 44. A second leg section 48 extends as continuation of the first leg section 46 and extends parallel to the first leg 40.

The stud screw 28 is accommodated in the first leg 30 of the first holding element in such a manner that a longitudinal axis extends in parallel to the web 34, so that the former comes into contact with the first leg 40 of the second holding element and exerts a force in order to tension in a force-exerting manner the first oblique leg section 46 of the second holding element against the oblique second leg section 38 of the first holding element. In the embodiment example shown in FIG. 2, the oblique leg section 38, 46 as well as a longitudinal edge of the first leg 40 in the tensioned state are bear upon the web 34 of the first holding element, which prevents the first holding element from tilting within the C-shaped inner profile 24 of the first holding element.

In the shown embodiment example, the first holding element 20 is accommodated in a longitudinal groove 50 of the shelf 12 that is embodied along a longitudinal edge 52 along the wall-facing side of the shelf 12. Consequently, in the assembled state the mounting device 10 will be covered and not visible.

FIG. 4 shows a front view of the mounting device 10, whereby the second holding element 20 has been accepted in the first holding element 16.

FIG. 5 shows a rear view of the first holding element 16, whereby openings 54 for accommodating the fastening means 18 are provided in the web 34 that connects the legs.

FIG. 6 shows a rear view of the second holding element 20, whereby openings 56 for accommodating the fastening means 22 are provided in the web 42 that connects the legs 40, 44.

FIG. 7 shows in a perspective representation a portion of a second embodiment of the first holding element 16 in the form of a C-track, whereby stabilizing webs 58 for stabilizing purposes are arranged between the first leg 30 and the second leg 32. In this, the stabilizing webs 58 extend in parallel to the connecting web 34 from an anterior front-side edge 60 of the first legs 30 to a transition 62 between the straight leg section 36 and the oblique leg section 38.

FIG. 8 shows a front view of a second embodiment of the first holding element 16, whereby between two stabilizing webs 58 are provided receptacles 64, 66, into each of which a respective section of the second holding element can engage.

FIG. 9 shows a lateral view of the second embodiment of a mounting device 68, comprising a first holding element 16, as well as a second embodiment of the second holding element 70. In this embodiment it is intended that the second holding element 70 can be frontally inserted into the first holding element 16 where it can subsequently be tensioned by means of the clamping element 28, such as a stud screw, in the direction of arrow 72.

FIG. 10a shows a lateral view of the first holding element and FIG. 10b shows a lateral view of the second holding element. The first holding element 16 is embodied as a C-track, with a first leg 30, a second leg 32, and a connecting web 34. The opening with a clear width W is located between the first leg 30 and the front edge of the oblique leg sections 38. In contrast to the first embodiment of the second holding element 26, the second holding element 70 possesses a height HA, which is greater than the clear width W and substantially corresponds to an inner height HI of the C-shaped inner profile 24 of the first holding element. Consequently the second holding element can not be inserted through the front opening but has to be pushed into the C-shaped inner profile from the end face, as is shown in the lateral view of FIG. 9.

FIG. 11 shows an embodiment of a mounting device 84, with a first holding element 16 and a second holding element 86, which is embodied with a U-shape. The second holding element comprises a first leg 88 and extending in parallel thereto a second leg 90, which are connected by a connecting web 92, whereby the first and second legs possess obliquely extending leg sections 94, 96. The oblique leg sections are in contact with the oblique second leg section 38 of the first holding element and/or with a second clamping element, e.g. a stud screw 98, arranged at the edge of the first leg 30. Further, provided in the straight leg section 36 is a third clamping element 100, in the form of a stud screw, which can be tensioned against the first leg 88 of the second holding element 86.

FIG. 12 shows a lateral view of a mounting device 102, whereby supplementary to the embodiment of FIG. 11, arranged in the oblique leg section 38 is a fourth clamping element such as a stud screw 104, which is in contact with and exerts a force upon the oblique section 94 of the U-shaped second holding element 86.

FIG. 13 shows a lateral view of a mounting device 106, whereby a first holding element 108 is embodied in a U-shape and comprises a first leg 110, a second leg 112, and a web 114 connecting the legs. In this embodiment it is intended that the end sections 116, 118 of the respective legs 110, 112 are bent toward each other and form oblique sections. The second holding element 86 also is embodied in a U-shape and corresponds to the holding element 86 of FIG. 11. The second holding element 86 is inserted frontally into the first holding element 108 and is secured in position by a first clamping element 120 in a straight leg section of the leg 110 and by a second clamping element 122 in the oblique leg section 118.

FIG. 14 shows a further mounting device 124, which substantially corresponds to the mounting device 106 of FIG. 13. However, in the embodiment 124, the clamping element 120 is arranged in the oblique leg section 116 of the leg 110, so that the clamping elements 120, 122 act upon the respective oblique surfaces 94, 96 of the second holding element.

FIGS. 15 to 20 show in lateral views further embodiments 126, 128, 130, 132, 134, 136 of the mounting device 68 of FIG. 9, whereby the second holding element 70 in its final position within the first holding element 16 is latched by means of latching means.

In the mounting device 126 of FIG. 15 it is intended that in the straight leg section 36 of the second leg 32, a groove 136 extends on the inner side of the profile along the longitudinal direction, into which engages a projection 138, which extends on a surface 140 of the straight leg sections 78 of the second holding element along the longitudinal direction.

For the mounting device 128 of FIG. 16 it is intended that the oblique leg section 38 of the leg 32 comprises on the inner side of the profile a projection 140 along the longitudinal direction, with which a groove 142 engages, which is incorporated along the longitudinal direction on an exterior surface of the oblique leg section 80 of the second holding element 70.

The mounting device 130 of FIG. 17 features a combination of the latching means of FIG. 15 and FIG. 16, whereby the groove 136 is arranged in the straight leg sections 36 of the first holding element 166 and the projection 140 is provided in the oblique leg section 38, while correspondingly in the first holding element 70, the projection 138 is provided in the straight leg element 78 while the groove 142 is arranged in the oblique leg element 80.

FIG. 18 shows the mounting device 132 as a particularly preferred embodiment, whereby provided at one end 144 of the oblique leg section 38 of the first holding element is a latching lug 146 along the longitudinal direction that is directed towards the interior of the profile and engages into a corresponding groove 148, which is provided, also along the longitudinal direction, in the oblique leg section 80 of the second holding element 70.

The mounting device 134 of FIG. 19 is characterized in that along a front edge of the straight leg section 78 of the second holding element 70 extends a groove 152, into which engages a corresponding spring 154, which extends along the longitudinal direction of an inner side 156 of the web 34 of the first holding element.

FIG. 20 shows a section of a mounting device whereby the clamping element 28 is embodied as a screw 158, which passes through the leg 30 and is secured in position in the leg by means of a nut 160. The screw 158 passes through the leg 74 of the second holding element 70 and on the inner side is secured in position by a nut 162. The nut 162 can also be embodied as a locking ring.

FIG. 21 shows a lateral view of a shelf arrangement 164, with a shelf bottom 166, e.g. of solid wood, whereby incorporated along a wall-side edge 168 is a groove 170, in which the second holding element 70 is fastened by means of fastening elements 172, e.g. screws. The shelf arrangement 164 is embodied in such a way that it can be inserted frontally into the first holding element 16.

FIG. 22a) shows a sectional representation of a shelf arrangement 174, comprising a shelf 176 consisting of a hollow structure with cross-webs 178, on whose upper and lower sides wood panels 178 are provided as a covering. Provided at a front edge 182 is a hollow space 184, into which the second holding element 70 is accepted and secured in position by means of fastening elements 186 such as screws.

FIG. 22b) shows a sectional top view onto the shelf arrangement 174, comprising the longitudinal elements 178 between which extend the cross-bars 190.

FIG. 23 shows a lateral view of a shelf arrangement 192 with a further embodiment of a second holding element 194. The second holding element 194 substantially corresponds to the holding element 70 of FIG. 10b, whereby a support element 196 extends perpendicular to the web 82 in extension of the first leg 74. Supported on the support element 196 is a shelf 198 and is fastened by means of fastening elements 200, e.g. screws. For the purpose of covering the first support element 194 as well as the hollow-wood element 198, it is intended that wood panels 202, 204 are provided both on the bottom and top sides and if required are connected such as glued or screwed via intermediate elements 206 to the hollow-wood element 198. In addition, along the longitudinal edges and the front edge, covering elements 208 are provided and are connected, e.g. screwed or glued to, the hollow-wood element.

FIG. 24 shows in a lateral view a further embodiment of a shelf arrangement 210. The shelf arrangement 210 comprises the first holding element 16 of FIG. 1, which is fastened to the wall 14. Secured in position within the first holding element 16 is a second holding element 212, which corresponding to the embodiments (of FIG. 2 and FIG. 10b) comprises a first leg 214 as well as a second leg 216, with an oblique leg section 218 and a straight leg section 220, which form a C-shaped outer profile. Originating from a web 222 that connects the legs 214, 216, a third leg 224 extends in extension of the first leg 214 and a fourth leg 226 extends as extension of the second leg 216, whereby the legs 224, 226 together with the connecting web 222 from a U-shape, into which a shelf 228 is accepted frontally.

FIG. 25 shows the shelf arrangement of FIG. 24 in a lateral view, whereby the shelf 228 on each of its bottom, top, and edge sides is covered by covering elements such as wood panels 230, 233, 234, whereby the wood panels 230, 232 are connected, e.g. glued, to the shelf 228 via support elements 236, 238.

FIG. 26 shows a lateral view of a shelf arrangement 240 with a first holding element 242, that is connected to a shelf 244. On the wall side, the second holding element 242 possesses a C-shaped outer profile, corresponding to the embodiments of FIG. 2 and FIG. 10b. On the shelf side, the second holding element 242 possesses a T-shaped outer contour 246, which is accepted in a T-shaped groove 248 of the shelf.

FIG. 27 shows in a lateral view a further embodiment 250 of a shelf arrangement, comprising a second holding element 252 as well as a second shelf 254. The second holding element 252 possesses a C-shaped outer contour, corresponding to the embodiment examples of FIG. 10b and FIG. 2. The second holding element 252 comprises the first leg 74, the second leg 76, as well as the web 82 connecting the legs, whereby approximately from the centre of the leg 82 extends perpendicularly a support element 256, which is accommodated in a longitudinal slot 258 of the shelf 254 and is secured in position by means of connecting elements such as screws 260.

FIG. 28 shows a perspective representation of the second holding element 252, with the known legs 74 and 76 that form the C-shaped outer contour, the connecting web 82, and the support element 256 that extends perpendicular to the connecting web 82.

FIG. 29 shows a top view onto a shelf arrangement 250, with a shelf 254, and a second holding element 252 with support element 256.

The subject matter of the invention is not limited to the embodiment examples listed and described above. It should in particular be mentioned that the various embodiments of the mounting device can also be used to mount objects such as towel racks, seats, shelfs, beams, and other planar objects.

FIG. 30 shows in a perspective view a towel-rack arrangement 258 with a U-shaped towel rack with legs 262, 264, the ends 266, 268 of which form the respective C- or U-shaped outer profile, which are accepted in a first holding element 270. In the illustrated embodiment example, the first holding elements 270 are embodied as sections of a C-track and are mounted to the wall 14. The towel rack 260 is pushed into the holding elements 270 either from the front or from the side face and in the respective holding element 270 is secured in position by a respective clamping element 28.

After the legs 262, 264 have been secured in position in the first holding element 270, they can be covered by rosettes 272 with a sealing element 274.

FIG. 31 shows a lateral view of an alternative mounting device 276 for fastening an object 278, such as a shelf, to a building structure 280 such as a wall. The mounting device 276 comprises a first holding element 282, which is connected via fastening means 284 to the object to be fastened, in this case a shelf 278. The mounting device 276 further comprises a second holding element 284, which via fastening means 285, e.g. a screw, is connected to the wall 280. In the shown embodiment example, the shelf 278 possesses along a wall-sided edge 286 a receptacle 288, into which the first holding element 282, in the form of a track or extruded profile, is accepted along the longitudinal extent of the wall-sided edge 286.

The second holding element 284 has a substantially C- or U-shaped outer profile 287. This outer profile can also be referred to as wedge-shaped. The second holding element 284 comprises a first leg 290, a second leg 292, as well as a web 294 that connects the legs 290, 292. On the wall side, the web 294 forms a planar area 296 that in the assembled state is in contact with a wall surface 298. The first leg 290 forms a lower surface 300, which substantially extends perpendicular to the wall-sided surface 296. The second leg 292 forms an oblique surface section 302, which extends obliquely relative to the horizontal at an angle α with 10°≤α≤80° preferably α=45° and at its end merges with a straight surface section 304 that extends in parallel to the lower surface 300. The lower surface 300 and the upper surface section 304 extend in parallel and are arranged spaced apart by a distance A. In addition, an opening 306, e.g. a bore, for accepting the fastening element 285, e.g. a screw, is provided in the web 294 connecting the legs 290, 292.

The first holding element 282 comprises a first leg 308, a second leg 310, as well as a web 312 connecting the legs 308, 310. The web 312 forms a lateral surface 314, which is secured in position on a wall-sided surface 316 of the shelf 278 by means of a fasting element 283, e.g. a screw. The first leg 308 forms a lower surface 320, which substantially extends perpendicular to the lateral surface 314. The leg 310 forms an upper surface 322 that extends parallel to the lower surface 320.

In the shown embodiment example, the lower surface 320 and the upper surface 322 are covered by respective covering elements 324, 326 of the shelf 276. The legs 308, 310 and the web 312, which substantially form a U-shaped cross-section, enclose a hollow space or inner profile 328, which substantially has a C- or U-shaped cross section and is adapted to the C- or U-shaped outer profile of the second holding element 284.

The first leg 308 on its inner side possesses a straight inner surface 330 that extends in parallel to the lower surface 320. The second leg 310 on its inner side forms a first oblique surface section 332, which extends inclined relative to a horizontal by an angle α with 10°≤α≤80° preferably α=45° and merges into a straight surface section 334, which extends parallel or substantially parallel to the lower surface section 330. The surface sections 332, 334 are embodied in such a way that they are adapted to the surface sections 302, 304 of the second holding element with respect to inclination and length so that in the assembled state they provide a good fit. In order to be able to plug the shelf 278 onto the second holding element 284 along the direction of the arrow 336, a lower edge 337 of the second leg 310 is arranged at a distance W from an upper edge of the first leg 308.

FIG. 32 shows the mounting device 276 in an assembled state, whereby the shelf 278 with the first holding element 282 has been plugged onto the second holding element 284 and has been secured in position. The second holding element is clamped against the first holding element and is secured in position relative to the latter by means of a clamping element 338. The clamping element 338 is embodied as a screw such as a grub screw and passes through a screw thread 340 in the first leg 308, so that the screw 338 is in contact with the lower side 300 of the second holding element and exerts a force against the second leg 310 of the first holding element, pushing it against the second leg 292 of the second holding element 284. Consequently, the oblique surface sections 292, 332, and the respective surface sections 304, 334 inter-engage and form a firm connection between the first holding element 282 and the second holding element 284. For securing-into-position purposes it is further intended that incorporated into the oblique surface 292 is a longitudinal groove 342, into which engages a corresponding slot 344, which is incorporated in the oblique surface 332.

FIG. 33 shows an alternative embodiment of a mounting device 346 for mounting a shelf 278 to a wall 280. The mounting device 346 comprises a first holding element 348, which can be fastened to the shelf 278 by means of a fasting element 350, as well as a second holding element 352, which can be connected to that of the wall 280 by means of a fastening element 354.

The first holding element 348 is accepted in the receptacle 288 of the wall-sided edge 286 of the shelf 278.

The second holding element 352 comprises a first leg 356, a second leg 358, as well as a web 360 connecting the legs 356, 358. A reinforcing element 362 such as a web is arranged between the first leg 356 and the second leg 358.

The first holding element 348 comprises a first leg 364, a second leg 366, as well as a web 368 connecting the legs. Provided in the lower leg 366 is a screw thread 370 for accepting a clamping element 372, which is in contact with and exerts a force on the second leg 358 of the second holding element, whereby the force exerted by the clamping element 372 is directed into the connecting web 262.

It is further intended that the second leg 358 with its longitudinal edge 374 is in contact with an inner side 376 of the leg 368 and is braced against the latter. Correspondingly, a longitudinal edge 378 of the first leg 358 also bears against the inner side 376 of the web 368, so that when bracing the clamping element 372 against the first leg 358, a force will act on the longitudinal edges 374, 378 in the direction of the inner side 376.

The first leg 356 forms a surface section 380 as well as a surface section 384, which extends in parallel to a lower side 382 of the second leg 258, whereby the first leg 364 possesses a corresponding oblique surface 386 and a corresponding straight surface 388, which are adapted to the surfaces 380, 384.

To improve the securing in place, a second clamping element 390 may be provided, which is accepted in a screw thread 392 and exerts a force when it is in contact with the first leg 356, or is accepted in a receptacle 394 such as a blind bore.

In the embodiment of FIG. 33 it is intended that a groove 396 has been formed along the longitudinal direction in the straight surface 384, in order to be able to accept a slot 398 that is incorporated into the straight surface section 380.

FIG. 34 shows a lateral view of an embodiment of a second holding element 400 in the form of an extruded profile, preferably an extruded Al profile, which is accommodated in the first holding element 348 as in the embodiment 346. In this embodiment, a first leg 402, a second leg 404, as well as a web 400 connecting the legs 402, 404 are embodied as a single monobloc component.

FIG. 35 shows a perspective representation of the extruded profile 400. The web 408 contains openings 410 such as holes for the screws 354 to pass through.

Figure 36:
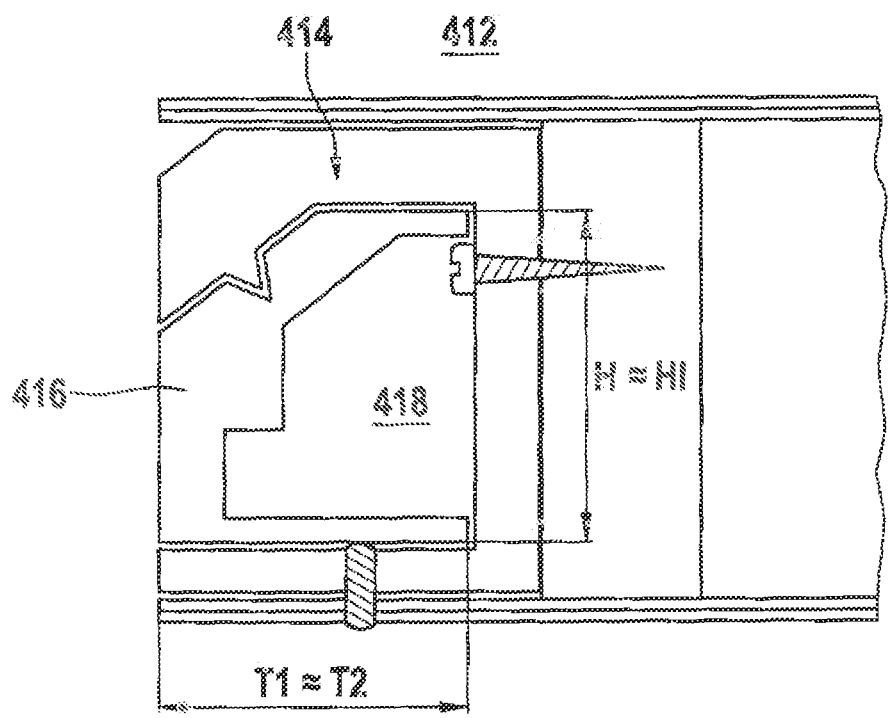

FIG. 36 shows an embodiment of a mounting device 412 that comprises a first holding element 414 and a second holding element 416, whereby the first holding element 414 possesses a recess 418 in the shape of a C- or U-shaped inner profile, into which the second holding element 416 is accepted without play. In particular, the outer holding element possesses an outer contour that substantially matches the inner profile 418. It is further intended that a depth T2 of the second holding element substantially corresponds to a depth T1 of the inner profile 418.

This second embodiment is characterized in that the first holding element is pushed onto the second holding element laterally. This embodiment is particularly suited for lightweight and narrow shelves and is characterized by a low overall height.

The invention claimed is:

1. A device for mounting a planar object to a building structure, comprising:
   a first holding element as well as a second holding element, wherein the second holding element is connectable in a form-locking manner with the first holding element,
   wherein the first holding element, which is connectable to the building structure or the object, or is an integral component of the building structure or of the object, comprises a C- or U-shaped inner profile, wherein the second holding element, which is connectable to the object or the building structure, or is an integral component of the object or of the building structure, comprises a C- or U-shaped outer profile, and wherein the C- or U-shaped outer profile is acceptable in a form-locking fit in the inner profile, and is tensionable against the inner profile by means of at least one clamping element;
   wherein the first holding element comprises a first leg, a second leg, and a web that connects the legs, wherein the first leg extends perpendicular to the web, and wherein the second leg possesses a first leg section or a surface area section that extends straight and perpendicular to the web, and an oblique surface area section, that is curved or inclined in the direction towards the first leg and extends obliquely relative to the straight surface area section;
   wherein the second holding element comprises a first leg, a second leg, and a web that connects the first leg and the second leg, wherein the first leg extends straight and perpendicular relative to the web, wherein the second leg comprises a first leg section which extends at an enclosed obtuse angle obliquely to the web, and a second legsection that is a continuation of the oblique first legsection, which extends parallel to the first leg;
   wherein the at least one clamping element is embodied as a screw which is accommodated in a screw thread of the first leg of the first holding element, wherein a center axisof the clamping element extends parallel to the web; and
   wherein the at least one clamping element is directed against the first leg of the second holding element; and
   wherein the first leg of the second holding element extends straight and perpendicular relative to the web of the second holding element.

2. The device of claim 1, wherein the C- or U-shaped inner profile of the first holding element is embodied as the inner profile of a C- or U-track or as an inner profile of an extruded profile.

3. The device of claim 1, wherein the C- or U-shaped outer profile of the second holding element is an outer profile of a C- or U-track or an outer profile of an extruded profile.

4. The device of claim 1, wherein at least one of the first leg and the second leg of the first holding element possesses the oblique surface section, and wherein the oblique surface area section interacts in a form-locking manner with a corresponding oblique surface section of the second holding element.

5. The device of claim 1, wherein the at least one clamping element is arranged in the first leg and/or the second leg in the straight leg section, and/or in the oblique leg section.

6. The device of claim 1, wherein the first holding element possesses a front opening with a clear width that is greater than a height of the C- or U-shaped outer profile of the second holding element.

7. The device of claim 1, wherein the second holding element is insertable frontally into the C- or U-shaped inner profile of the first holding element.

8. The device of claim 1, wherein the first holding element possesses a depth, that is equal or greater than a depth of the C- or U-shaped outer profile of the second holding element.

9. The device of claim 1, wherein the second holding element is pushable into the first holding element along its longitudinal axis from the end face.

10. The device of claim 1, wherein the second holding element is arranged in the first holding element in a latchable manner.

11. The device of claim 1, wherein the straight and/or oblique surface section of the second holding element possesses on its outside along the longitudinal direction a latching lug or slot, and wherein an inner surface of the straight or oblique leg section of the first holding element possesses a slot to accept the latching lug, or possesses a latching lug to engage into the slot.

12. The device of claim 1, wherein the first holding element or the second holding element with its web is fastened to a longitudinal edge of the planar object, or to the wall.

13. The device of claim 1, wherein the first holding element or the second holding element is arranged concealed in a groove or in a cavity of a longitudinal edge of the planar object.

14. A method for mounting a planar object in a form of a shelf to a building structure in a form of a wall, comprising:
   providing a device comprising a first holding element and a second holding element, wherein the second holding element is connectable in a form-locking manner with the first holding element;
   connecting the first holding element to the building structure or the object, or provide the first holding element as an integral component of the building structure or of the object, wherein the first holding element comprises a C- or U- shaped inner profile, connecting the second holding element to the object or the building structure, or provide the second holding element as an integral component of the object or of the building structure, wherein the second holding element comprises a C- or U-shaped outer profile, and fitting the C- or U-shaped outer profile in a form-locking fit in the inner profile and tensioning the outer profile against the inner profile by means of at least one clamping element;
   wherein the first holding element comprises a first leg, a second leg, and a web that connects the legs, wherein the first leg extends perpendicular to the web, and wherein the second leg possesses a first leg section or a surface area section that extends straight and perpendicular to the web, and an oblique surface area section, that is curved or inclined in the direction towards the first leg and extends obliquely relative to the straight surface area section;
   wherein the second holding element comprisesa first leg, a second leg, and a web that connects the first leg and the second leg, wherein the first leg extends straight and perpendicular relative to the web, wherein the second leg comprises a first leg section which extends at an enclosed obtuse angle obliquely to the web, and a second leg section that is a continuation of the oblique first leg section, which extends parallel to the first leg;

wherein the at least one clamping element is embodied as a screw which is accommodated in a screw thread of the first leg of the first holding element, wherein a center axis of the clamping element extends parallel to the web; and wherein the at least one clamping element is directed against the first leg of the second holding element; and wherein the first leg of the second holding element extends straight and perpendicular relative to the web of the second holding element.

15. A planar object in a form of a shelf, comprising:

a device for mounting the planar object to a building structure;

wherein the device comprises a first holding element and a second holding element, wherein the second holding element is connectable in a form-locking manner with the first holding element;

wherein the first holding element, which is connectable to the building structure or the object, or is an integral component of the building structure or of the object, comprises a C- or U-shaped inner profile, wherein the second holding element, which can be connected to the object or the building structure, or is an integral component of the object or of the building structure, comprises a C- or U- shaped outer profile, and wherein the C- or U-shaped outer profile can be accepted in a form-locking fit in the inner profile and can be tensioned against the inner profile by means of at least one clamping element;

wherein the first holding element comprises a first leg, a second leg, and a web that connects the legs, wherein the first leg extends perpendicular to the web, and wherein the second leg possesses a first leg section or a surface area section that extends straight and perpendicular to the web, and an oblique surface area section, that is curved or inclined in the direction towards the first leg and extends obliquely relative to the straight surface area section;

wherein the second holding element comprises a first leg, a second leg, and a web that connects the first leg and the second leg, wherein the first leg extends straight and perpendicular relative to the web, wherein the second leg comprises a first leg section which extends at an enclosed obtuse angle obliquely to the web, and a second leg section that is a continuation of the oblique first leg section, which extends parallel to the first leg;

wherein the at least one clamping element is embodied as a screw which is accommodated in a screw thread of the first leg of the first holding element, wherein a center axis of the clamping element extends parallel to the web; and wherein the at least one clamping element is directed against the first leg of the second holding element; and wherein the first leg of the second holding element extends straight and perpendicular relative to the web of the second holding element.

* * * * *